April 12, 1949.
L. L. PRITCHARD
2,467,155
CONTAINER FOR HOLDING AND DISPENSING
PERISHABLE COMMODITIES
Filed Oct. 13, 1947
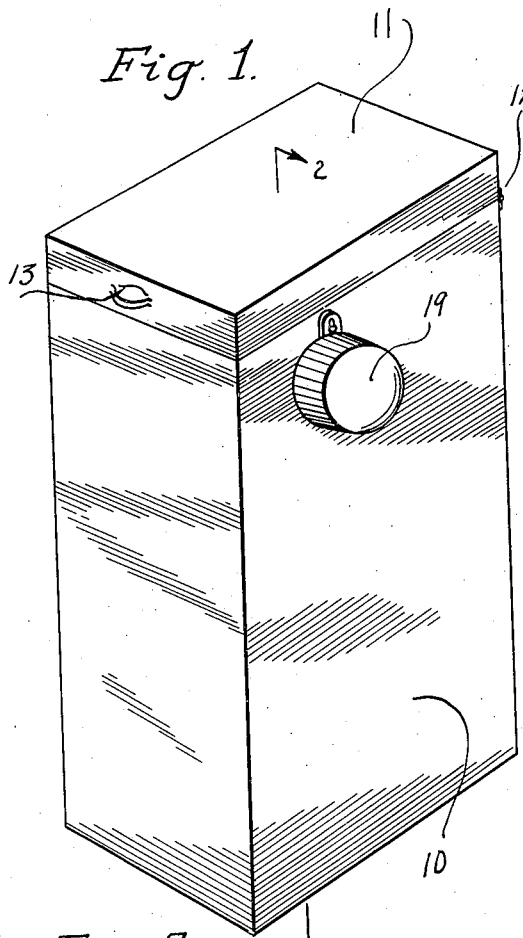
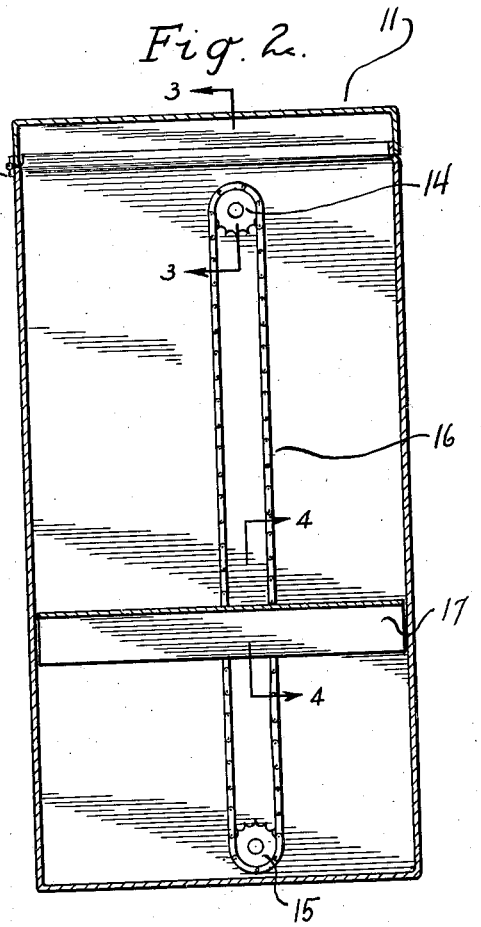
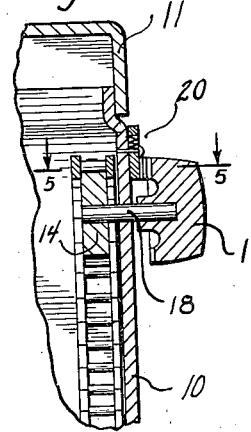
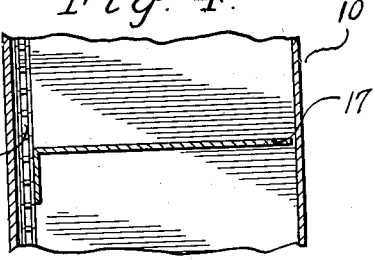
INVENTOR,
LOUIS L. PRITCHARD,
BY
Jerome W. Payton
AGENT Patented Apr. 12, 1949

2,467,155

UNITED STATES PATENT OFFICE 2,467,155

CONTAINER FOR HOLDING AND DISPENSING PERISHABLE COMMODITIES

Louis L. Pritchard, Benton, Ark.

Application October 13, 1947, Serial No. 779,484

2 Claims. (Cl. 312—71)

1

This invention relates to a container for holding and dispensing perishable portions in a sanitary manner, and more particularly it relates to a container for holding and dispensing slices of bread, sandwiches and the like.

In most restaurants and other public eating establishments, it has been customary to place slices of bread on a plate or tray and cover such slices with a napkin for the customers. This practice is not entirely satisfactory for two reasons. In the first place, the bread tends to dry out, with the attendant monetary loss, due to waste. In the second place, this procedure is not fully sanitary, since persons other than the actual consumer of the commodity often handle the bread.

Accordingly, an important object of my invention is to provide a container wherein the bread will stay fresh and the container being provided with means for dispensing a single slice, when desired.

And a further object of my invention is to provide a container from which bread may be dispensed at will and by the use of which the bread is handled only by the person desiring the bread slices.

An additional object of the present invention is to provide a combined container and dispenser for individual slices of a perishable commodity which is simple in structural details, positive in operation and which can be easily and cheaply manufactured.

To accomplish the above and other objects, my invention comprises a container so designed as to accommodate the perishable commodity to be served, and having a movable closure therefor. Disposed within the container and operable from a point exteriorly of the container is a commodity elevating device which, when operated, will move the article to be dispensed to a position which is readily accessible upon opening the closure.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 is a view in perspective of the container and dispenser constructed according to my inventive concept.

Figure 2 is a sectional view taken along the

2 line 2—2 of Figure 1, looking in the direction of the arrows, but being on a slightly enlarged scale.

Figure 3 is a fragmental sectional view taken along the line 3—3 of Figure 2, looking in the direction of the arrows, but being on a slightly enlarged scale.

Figure 4 is a sectional view taken along the line 4—4 of Figure 2, looking in the direction of the arrows.

Figure 5 is a sectional view taken along the line 5—5 of Figure 3, looking in the direction of the arrows.

As shown in Figures 1 and 2, I provide a container 10 having an open upper end which is adapted to be closed by a cover or lid 11 hinged to the body of the container adjacent its upper end, as shown at 12. The container 10 may be made of wood, plastic or metal and is of a configuration to conform generally to the shape of the commodity disposed therein. In this particular instance, the container 10 is rectangular in outline to correspond to the shape of a standard loaf of bread. The cover or lid 11 is provided with a finger grip 13 to enable the cover to be moved about its hinges 12.

Mounted on the interior of one of the side walls of the container are upper and lower sprockets 14 and 15, respectively, over which is trained an endless chain or the like 16. Welded or otherwise conveniently secured to the chain 16 is a tray or shelf 17, as shown in Figure 4. The tray 17 is adapted to support the commodity to be disposed within the container 10. To impart movement to the chain 16 and hence to the tray 17, it will be observed that the sprocket 14 carries a shaft 18 which extends a substantial distance beyond the side wall of the container 10. An operating knob or button 19 is keyed to the shaft 18, whereupon rotation of the knob will effect a rotation of the sprocket 14 and hence cause the chain 16 to move. To lock the button 19 in the desired position, it will be seen in Figures 3 and 5 that a spring-pressed detent 20 is suitably secured to the side wall of the container so that the detent may engage teeth 21 formed on the knob 19 for locking the knob in the desired position.

In operation, the cover 11 is moved to its open position and by removing the detent 20 out of engagement with the teeth 21, the tray 17 may be lowered and the downward movement can be controlled by proper manipulation of the knob 19. When the tray is in its lowermost position, one end of the bread wrapper is opened and the loaf of bread is placed within the container 10 resting upon the tray 17. When a customer desires a slice of bread, it is merely necessary to rotate the knob 19 to elevate the tray the desired distance, and upon opening the cover 11, a slice of bread may be removed therefrom.

It will be readily appreciated from the foregoing that I have provided a novel container for storing and dispensing slices of a perishable commodity, such as bread, which will serve to keep the bread in a fresh and sanitary condition. The commodity is only touched by the person desiring it, which, of course, is highly desirable, particularly from the sanitary point of view. While the invention finds particular application for use in restaurants, it is, of course, of broader scope and can be employed with efficacy in the home and other places where it is desired to keep bread or the like in a fresh condition.

I claim:

1. In a container for holding and dispensing slices of a perishable commodity in a sanitary condition, a housing having an open upper end, a cover pivoted to the housing for closing the open end, upper and lower sprockets journaled in one side wall of the housing, a flexible member trained over said sprockets, a tray carried by the flexible member for supporting the perishable commodity, a shaft extending exteriorly of the housing from said upper sprocket, and a control knob located outside said housing and directly connected to the free end of said shaft whereby rotation of the knob will move said upper sprocket and the flexible member and tray toward the open upper end of the housing.

2. In a container for holding and dispensing slices of a perishable commodity in a sanitary condition, a housing having an open upper end, a cover pivoted to the housing for closing said open end, upper and lower sprockets journaled in one side wall of the housing, a flexible member trained over said sprockets, a tray carried by the flexible member for supporting the perishable commodity, a shaft extending exteriorly of the housing from said upper sprocket, a control knob located outside said housing and directly connected with the free end of said shaft whereby rotation of the knob will move said upper sprocket and the flexible member and tray toward the open end, a plurality of teeth on said knob, a spring-pressed detent on said housing adapted to engage one of the teeth on said knob for locking said knob in the desired position.

LOUIS L. PRITCHARD.

REFERENCES CITED

The following references are of record in the file of this patent:

UNITED STATES PATENTS

| Number | Name | Date |
|---|---|---|
| 494,346 | Peirce | Mar. 28, 1893 |
| 1,393,588 | Tuttle | Oct. 11, 1921 |
| 1,748,032 | Weidmann | Feb. 18, 1930 |

FOREIGN PATENTS

| Number | Country | Date |
|---|---|---|
| 89,079 | Sweden | 1937 |